(12) United States Patent
Bahrton

(10) Patent No.: US 6,422,834 B1
(45) Date of Patent: Jul. 23, 2002

(54) REVERSING VALVE FOR A DIAPHRAGM PUMP

(76) Inventor: Svante Bahrton, Selmedalsringen 18, Hägersten (SE), 129 36

(*) Notice: Subject to any disclaimer, the term of this patent is extended or adjusted under 35 U.S.C. 154(b) by 0 days.

(21) Appl. No.: 09/530,590

(22) PCT Filed: Nov. 12, 1998

(86) PCT No.: PCT/SE98/02044

§ 371 (c)(1),
(2), (4) Date: May 5, 2000

(87) PCT Pub. No.: WO99/25998

PCT Pub. Date: May 27, 1999

(30) Foreign Application Priority Data

Nov. 13, 1997 (SE) .............................. 9704160

(51) Int. Cl.⁷ ........................... F04B 43/06; F04B 9/08; F04B 35/02; G05D 7/00; G05D 11/00
(52) U.S. Cl. ..................... 417/395; 417/386; 417/384; 417/383; 137/106; 137/119.09
(58) Field of Search ................ 417/395, 394, 417/386, 384, 383; 137/106, 119.02, 119.09

(56) References Cited

U.S. PATENT DOCUMENTS

| | | | | |
|---|---|---|---|---|
| 1,920,014 A | * | 7/1933 | Horton et al. ............... | 417/393 |
| 2,927,606 A | * | 3/1960 | Matchette, Jr. et al. ..... | 137/608 |
| 3,051,188 A | * | 8/1962 | Tilney ......................... | 137/119 |
| 3,709,244 A | * | 1/1973 | Zadow et al. ............... | 137/106 |
| 3,722,525 A | * | 3/1973 | Epple ......................... | 137/106 |
| 3,738,227 A | * | 6/1973 | Bitzer et al. ................ | 91/167 |
| 3,791,768 A | * | 2/1974 | Wanner ....................... | 417/393 |
| 4,344,212 A | * | 8/1982 | Bolssens et al. ............ | 29/33 F |
| 4,432,215 A | * | 2/1984 | Yoshida ...................... | 62/324.6 |
| 4,817,666 A | * | 4/1989 | Sanville ................. | 137/596.17 |

FOREIGN PATENT DOCUMENTS

| | | | |
|---|---|---|---|
| DE | 39 09 800 | 9/1990 | ........... F04B/43/06 |
| EP | 0 132 913 | 2/1985 | ........... F04B/43/06 |
| EP | 0 492 242 | 7/1992 | ........... F16K/31/06 |
| SE | 503 552 | 7/1996 | ........... F04B/43/06 |

\* cited by examiner

Primary Examiner—Charles G. Freay
Assistant Examiner—Timothy P. Solak
(74) Attorney, Agent, or Firm—Jacobson Holman, PLLC

(57) ABSTRACT

A valve arrangement including a valve housing (10) which includes an inlet port (11) and two outlet ports (12, 13) for fluid flowing through the housing. A valve element (15) is accommodated in a first valve space in the valve housing and movable between two end positions. The valve element includes two surfaces (16), each of which is adapted for co-action with a respective outlet port such as to close an associated outlet port in one and the other of the end positions of the valve element (15). A device (20 or 21 and 26, 47) for resetting the valve element between the positions. The valve element (15) is mounted on one end of a pivotal arm (18) and has the form of a valve plate or disc which includes valve-element surfaces (16) for alternate co-action with a respective outlet port (12, 13). The arm (18) carrying the valve element (15) is connected mechanically to and adapted to drive a further valve element (42), which is accommodated in a separate, second valve space, between two positions in which the further valve element connects one or the other of two fluid inlet ports (43) to a fluid outlet port (45) which is common to the fluid inlet ports.

17 Claims, 5 Drawing Sheets

US 6,422,834 B1

REVERSING VALVE FOR A DIAPHRAGM PUMP

CROSS-REFERENCE TO RELATED APPLICATIONS

This application is related to REVERSING VALVE FOR A DIAPHRAGM PUMP to Svante Bahrton, Ser. No. 09/530,590 filed May 5, 2000.

BACKGROUND OF THE INVENTION

1. Field of the Invention

The present invention relates to a valve arrangement of the kind that includes a valve housing which has an inlet port and two outlet ports for fluid flowing through the housing. The valve housing includes a first valve chamber which accommodates a valve element that can move between two end positions and that has two surfaces which each co-act with a respective outlet port and which function to close an associated outlet port in respective first and second end positions of the valve elements. The valve arrangement further including means for switching the valve element between the positions and the valve element being mounted on one end of a pivotal arm.

2. Related Art

Valve arrangements of this kind are known, for instance, from EP 0 492 242.

SUMMARY OF THE INVENTION

The object of the present invention is to provide a novel and improved valve arrangement chat comprises removable parts, and which can be reset quickly and positively and which will not become adjusted to a neutral position in which both of said output ports communicate permanently with the inlet port at one and the same time.

It is proposed to this end in accordance with the invention that the valve element of a valve arrangement of the afore-described kind shall be given the form of a valve plate or valve disc that has mutually opposite a valve element surfaces disposed for alternate co-action with a respective outlet port; and in that the arm carrying said valve element is coupled mechanically to a further valve element accommodated in a separate, second valve chamber such as to drive said further valve element between two positions in which said element connects one or the other of two fluid inlet ports to a fluid outlet port which is common to said two fluid inlet ports. This arrangement provides an improved valve arrangement with the aid of simple means.

Further characteristic features of the invention will be apparent from the following wherein an object of the invention is to provide that the pivotal arm extends into the further valve space and carries the further valve element at a second end located within the further valve space, wherewith the further valve element also has the form of a valve plate which includes mutually opposite valve-element surfaces for co-action with a respective associated inlet port.

Another object of the invention is to provide that the valve arrangement is co-ordinated with a double-acting pump which includes two spaces having valve-controlled respective inlets and outlets for a gaseous drive fluid and a liquid working fluid transported by the pump, wherewith the spaces are divided into an operating chamber and a working chamber by means of a movable partition wall in the form of a diaphragm, in that a device for transferring movement of one partition wall to the other partition wall, and vice versa, extends between the movable partition walls, and in that each of the operating-chamber inlets is coupled to its respective outlet port associated with the first valve space of the valve arrangement, and each operating chamber outlet is connected to its respective fluid inlet port associated with the second valve space.

A still further object of the invention is to provide that the each operating chamber is connected to its respective outlet port of the valve arrangement via a conduit which is adapted to be closed by the associated partition wall immediately prior to the commencement of a working stroke of the partition wall, and in that a fluid bleed passageway extends between the outlet ports and the inlet port common to the outlet ports.

Another object of the invention is to provide that each of the bleed passageways is comprised of a bore or channel that extends through the material of the valve housing or through associated valve element.

An object of the invention is to provide that the partition walls include bellow-like structures which are open to the conduits and which function to generate an over pressure in an associated conduit when closing the conduit.

A still further object of the invention is to provide that the operating chambers are located close together on both sides of the valve arrangement, and in that the partition walls are provided with pins which each extend into a respective outlet port and, when the partition walls are in their inner end positions, act on an associated valve-element surface so as to reset the valve element.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Also from the following description of a number of chosen, exemplifying embodiments of the novel valve arrangement illustrated in the accompanying drawings.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Valve components that find correspondence or general correspondence in the different Figures of the drawings have been identified with the same reference signs.

Figure 1:
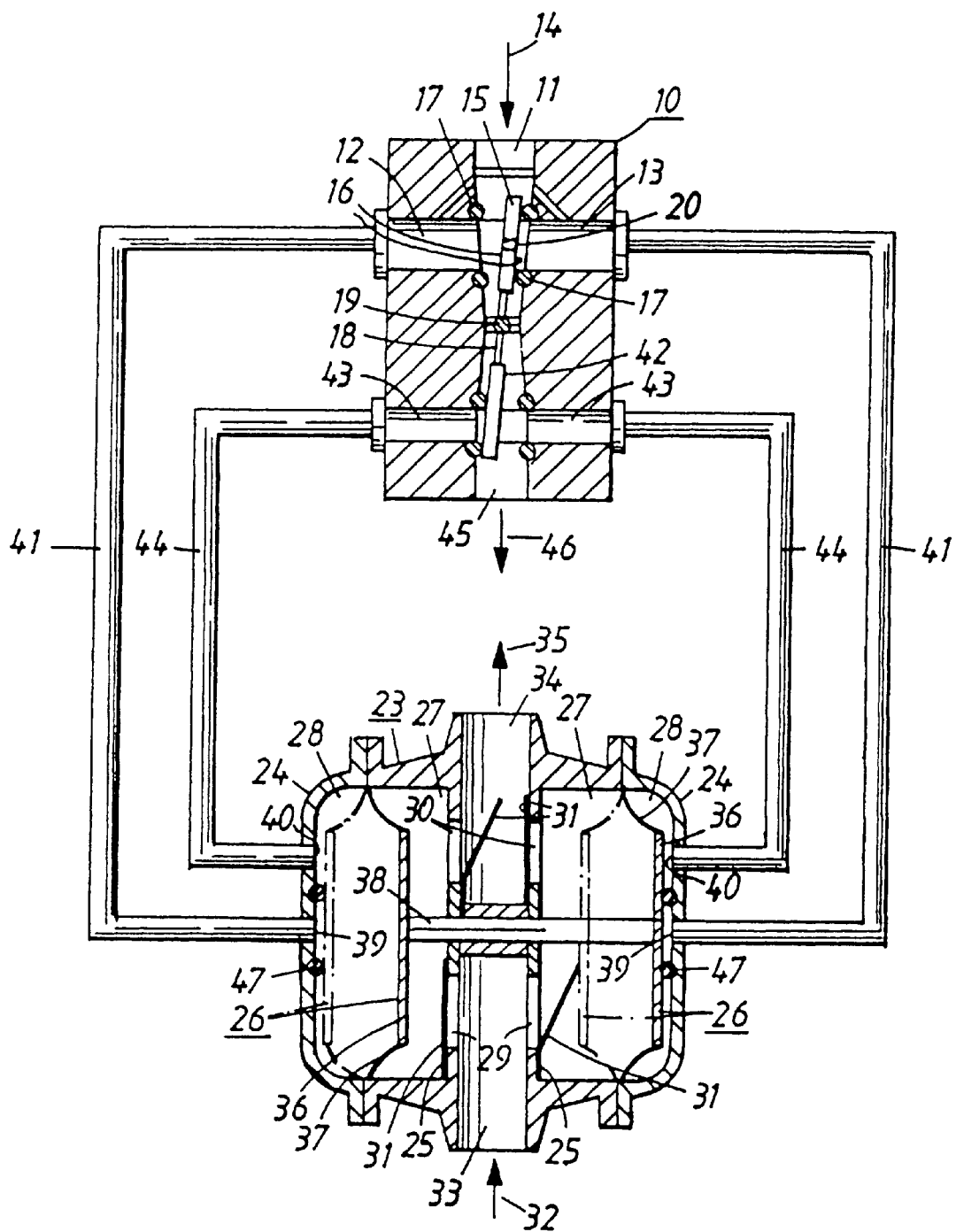
FIG. 1 is a highly schematic, sectional view of a first embodiment of an inventive valve arrangement combined with a double-acting pump.

The valve arrangement illustrated in FIG. 1 comprises a valve housing 10 which includes an inlet port 11 and two outlet ports 12, 13 for fluid, either gaseous or liquid, flowing through the valve housing. The fluid is delivered at an overpressure from a source (not shown), as indicated by arrow 14. The valve housing 10 accommodates a movable valve element 15 which has mutually opposite surfaces 16 for closing an associated outlet port 12 or 13 in a respective one or the other of two end positions of the valve element 15. The orifices of respective outlet ports are surrounded by sealing rings 17, to facilitate sealed closure of the valve. The valve element 15 is comprised of a valve plate or valve disc, the mutually opposite sides of which form closing surfaces 16 and which is mounted on one end of a movable arm 18. The arm 18 is mounted in the valve housing 10 at 19 for pivotal movement between said end positions, wherewith the surfaces 16 of said valve element close one or the other of said outlet ports 12, 13. However, it lies within the scope of the invention to provide the valve-element surfaces on a valve element which has a different form than the illustrated valve element, for instance a substantially spherical form. In the illustrated case, the fluid entering through the inlet port 11 passes through the valve housing 10 and out through the open outlet port 12. The closed outlet port 13 is not placed under pressure and consequently the valve element 15 will be held pressed against the port 13 by the force exerted by the inflowing fluid.

Figure 5:
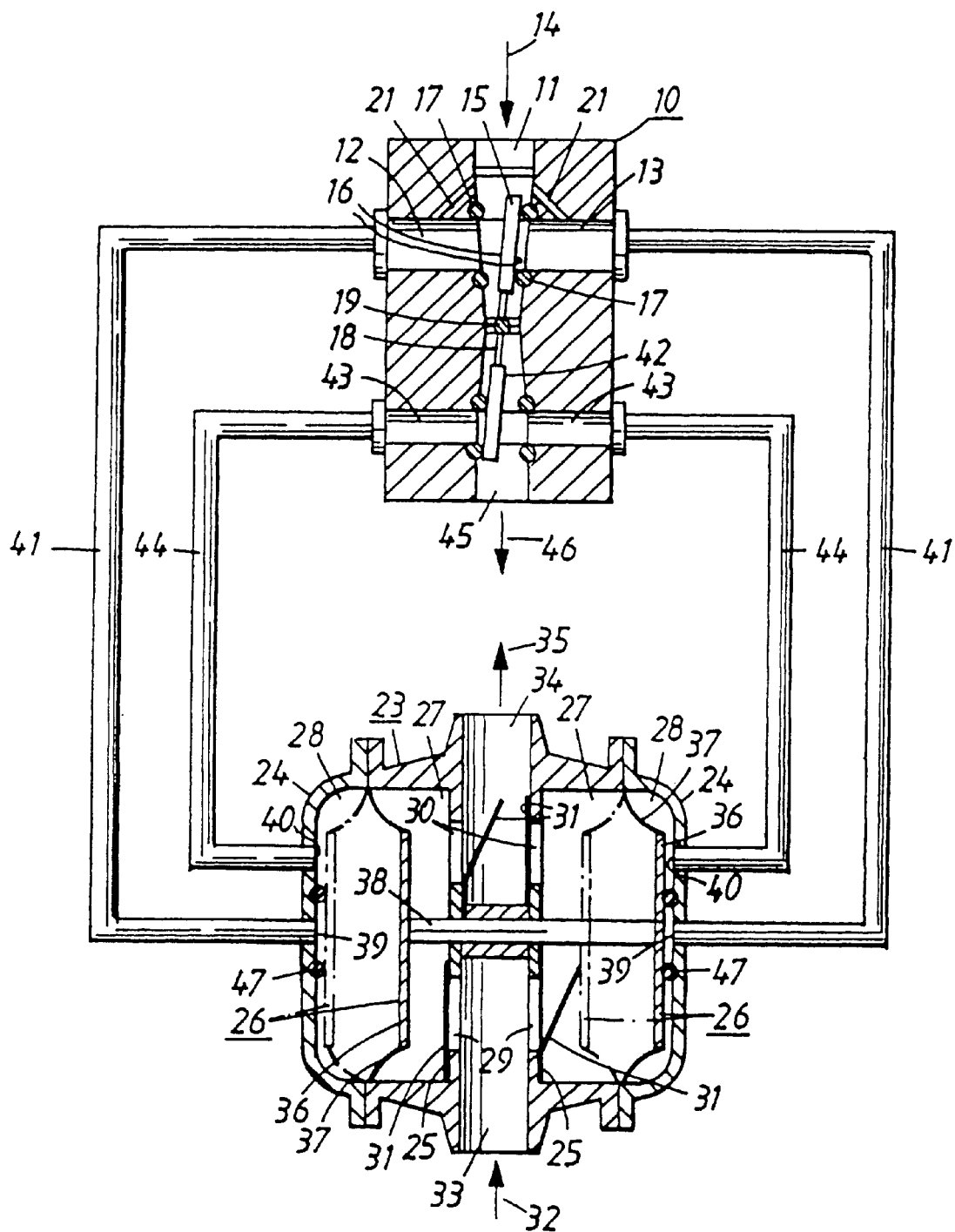
FIG. 5 is a sectional view similar to FIG. 1, which show two bleed passageways.

In the FIGS. 1 and 5 embodiments, the valve element 15 has extending therethrough a bleed passageway or opening 20 whose area is so small that the flow of medium through the passageway or opening 20 will be essentially negligible in relation to the total flow through the valve housing 10. The bleed passageway or bleed opening 20 can be replaced with, e.g., two bleed passageways (shown at 21 in FIG. 5 that extend between the inlet port 11 and a respective one of the outlet ports 12, 13. The valve arrangement is reset by closure means 26, 47 which are adapted to stop temporarily all flow of fluid through an associated outlet port. The means being described in more detail below. The closure means 26, 47 and the bleed passageways 21 or the bleed opening 20 thus form a valve resetting means. Switching of the valve from the illustrated valve mode or state in which the fluid passes in through the port 11 and out through the port 12 is effected by virtue of the closure means 26, 47 shown to the right in FIGS. 1 and 5 becoming active so as to build-up a static fluid pressure in the port 13 via a conduit 41, as a result of the presence of the bleed opening or bleed passageways 20, 21. The static fluid pressure generating on the surface of the valve element 15 facing towards the port 13 a force that exceeds the pressure exerted on the opposite surface of the valve element by the fluid flowing through the valve housing 10. The differential pressure created by the fluid flow therewith swings the valve element 15 rapidly away from the position in which it seals the port 13 and further, until it reaches the position in which it seals the outlet port 12, so that fluid will now exit through the port 13 as soon as the closure device 26, 47 shown on the right of FIGS. 1 and 5 has returned to the position in which the port 13 is open.

FIG. 1 shows an inventive valve arrangement connected for controlling the operation of a double-acting diaphragm pump. The pump includes a generally cylindrical pump housing 23 which includes two spaces that are delimited by the end walls 24 of the housing and internal walls 25. Each of these spaces is, in turn, divided into a working chamber 27 and an operating chamber 28 by means of a respective diaphragm unit 26, said working chambers 27 being located close to one another and said operating chambers being located outwardly of their associated diaphragm unit 26. Each of the working chambers 27 has valve-controlled inlets and outlets 29, 30 for working fluid transported by the pump, preferably a liquid working fluid. In the illustrated embodiment, the inlets and outlets 29, 30 have the form of openings in the inner chamber walls 25 and check valves 31 in the form of flap valves co-acting with said openings. The working fluid arrives to a space 33 in the pump located between the walls 25, in the direction indicated by arrow 32, and leaves the pump through a diametrically opposite space 34 which is also located between the walls 25, and exits said space 34 in the direction of arrow 35.

The diaphragm units 26 include a round, relatively rigid central part 36, and a peripheral part 37 which is comprised of a relatively pliable material and which is connected to the pump housing 23 at its radially outer edge. The diaphragm units 26 are connected to one another by means of a rod 38 which transfers the movement of one diaphragm unit to the other, and vice versa. For instance, when the diaphragm unit 26 on the left in FIG. 1 moves to the right in response to pressurized operating fluid or drive fluid, e.g. compressed air, in the left operating chamber 28, the rod 38 will press the right diaphragm unit 26 to the right as seen in the FIG.1.

The operating chambers 28 are provided at 39 and 40 with openings that serve as drive-fluid inlets and outlets respectively, wherewith the inlets 39 are connected via conduits 41 and the valve arrangement 10, to a pressurized fluid source, e.g. to a compressed air network. In addition to the valve element 15 mounted at 19 on the arm 18, the valve arrangement includes a further valve element 42 in the form of a valve plate or valve disc mounted on the other end of the arm 18, said arm 18 being pivotally mounted between its ends in the case of the illustrated embodiment. The further valve element 42 is accommodated in a valve-housing space or room that is separated from the inlet and outlet ports 11–13 in a gas-tight and liquid-tight manner and the mutually opposite sides of said valve element close one or the other of two inlet ports 43 arranged in the valve housing 10 and intended for return fluid from the operating chambers 28. The latter are connected to the ports 43 via the outlets 40 and conduits 44. The area of the ports 43 is smaller than the area of the ports 12, 13 and said ports 43, in turn, communicate with an outlet port 45 for return fluid, depending on the position of the valve element 42, said return fluid leaving the valve housing 10 in the manner indicated by arrow 46. The valve element 42 is reset by means of the valve element 15 and the arm 18 in a manner such as to establish communication between the operating chamber 28 and the outlet port 45 to the right in FIG. 1, provided that there is communication between the operating chamber 28 on the left of FIG. 1 and the operating-fluid inlet port 11 of the valve arrangement, whereas communication between the operating chamber 28 on the left in FIG. 1 and the outlet port 45 will be established provided that the operating chamber 28 on the right of FIG. 1 communicates with the inlet port 11 of the valve arrangement.

Disposed around the operating fluid inlets 40 are seals 47 with which the central parts 36 of the diaphragm units are brought into sealing contact when said diaphragm units 26 reach their outer positions, as illustrated on the right in FIG. 1.

The valve arrangement illustrated in FIG. 1 operates in the following manner: The pressurized drive fluid or operating fluid passes to the left operating chamber 28, through the inlet port 11, the outlet port 12 and the conduit 41 connected thereto. The outlet port 43 on the left in FIG. 1 is held closed by means of the force exerted by the incoming drive fluid on the valve element 15. The left diaphragm unit 26 is pressed to the right and therewith also presses the right diaphragm unit 26 to the right in FIG. 1, through the medium of the rod 38. Working fluid is therewith pressed out from the left working chamber 27, through the open outlet 30, and is sucked into the right working chamber 27 through the open inlet 29, while drive fluid departs through the outlet 40, the conduit 44 and the port 45 of the right operating chamber 28. When the central part 36 of the right diaphragm unit 26 has reached its end position and seals against the sealing ring 47 around the right inlet conduit 41, there is built-up by the drive fluid entering the port 13 through its associated bleed passageway 20 or 21 a static over pressure which automatically resets the valve element 15 of the valve arrangement in the aforedescribed way. The flow through the pump and valve arrangement will therewith be reversed, i.e. drive fluid will be pressed through the port 13 and into the operating chamber 23 on the right of FIG. 1 and will leave through the left operating chamber, whereas working fluid will be pressed out from the right working chamber 27 and sucked into the left working chamber until the left diaphragm unit 26 reaches its outer end position and therewith automatically resets the valve element 15.

Figure 2:
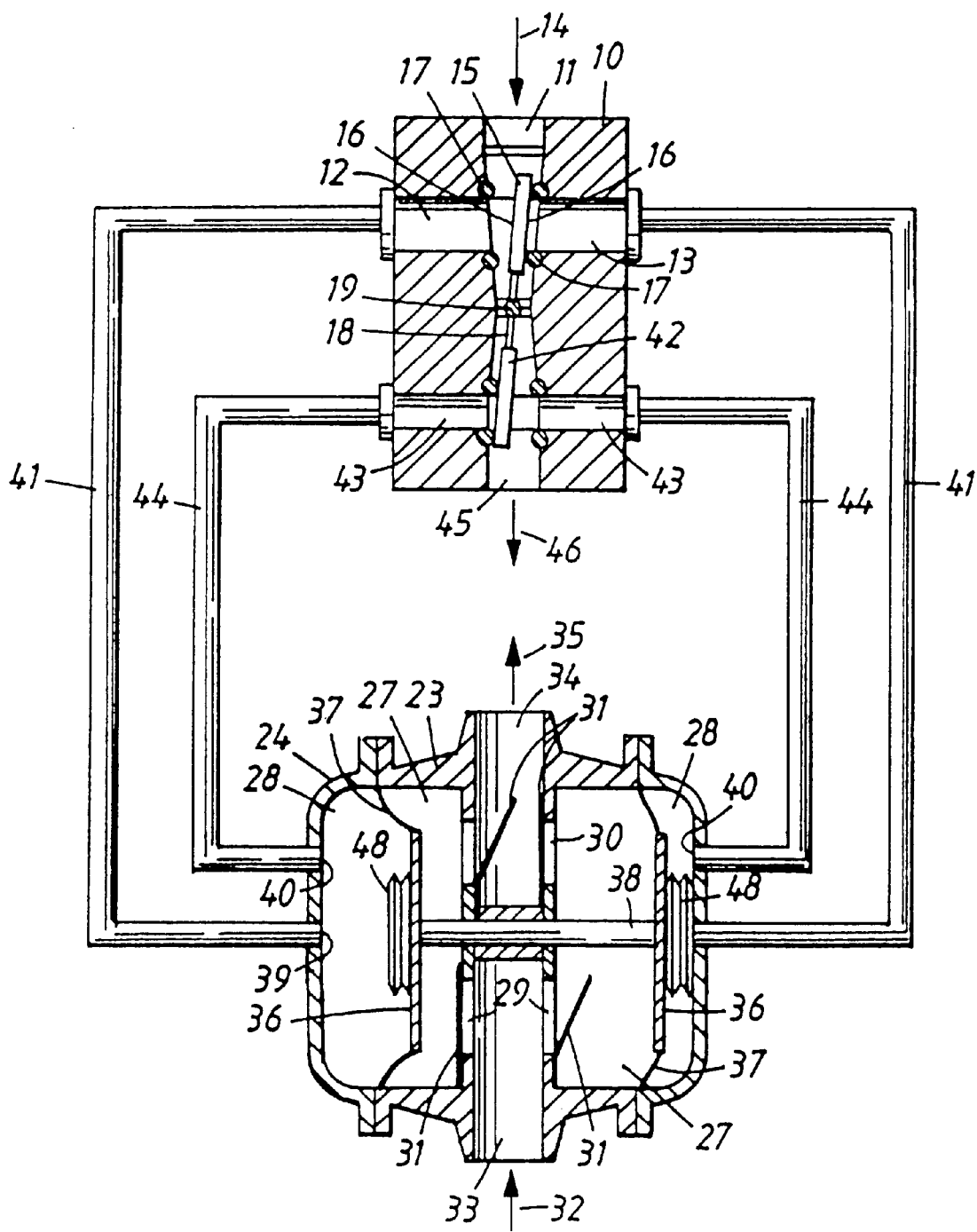
FIG. 2 is a sectional view similar to FIG. 1, but with a modified resetting means.

The arrangement illustrated in FIG. 2 is similar to the arrangement illustrated in FIG. 1 and will be described solely with reference to those respects in which it differs from the FIG. 1 embodiment. The difference resides in the ability to avoid the use of bleed passageways, such as the passageways 20 or 21, so that all drive fluid entering through the inlet port 11 can be used for useful work. In order to generate a force that will balance out the force exerted by the flowing working fluid on the valve element 15 and also the small force exerted by the flow of return fluid on the valve element 42, the outer sides of the partition walls 26 are provided with bellows-like structures 48 that open towards a respective pump end-wall 24. These bellows like structures sealingly abut respective end-walls around the inlet 40 in the proximity of the end positions of the partition walls 26 and press used drive fluid through the conduit 41 connected to said inlet, so as to generate a valve-resetting pressure in that inlet port 12, 13 that is not at the moment in use, i.e. the port 13 in the state of the pump shown in FIG. 2.

Figure 3:
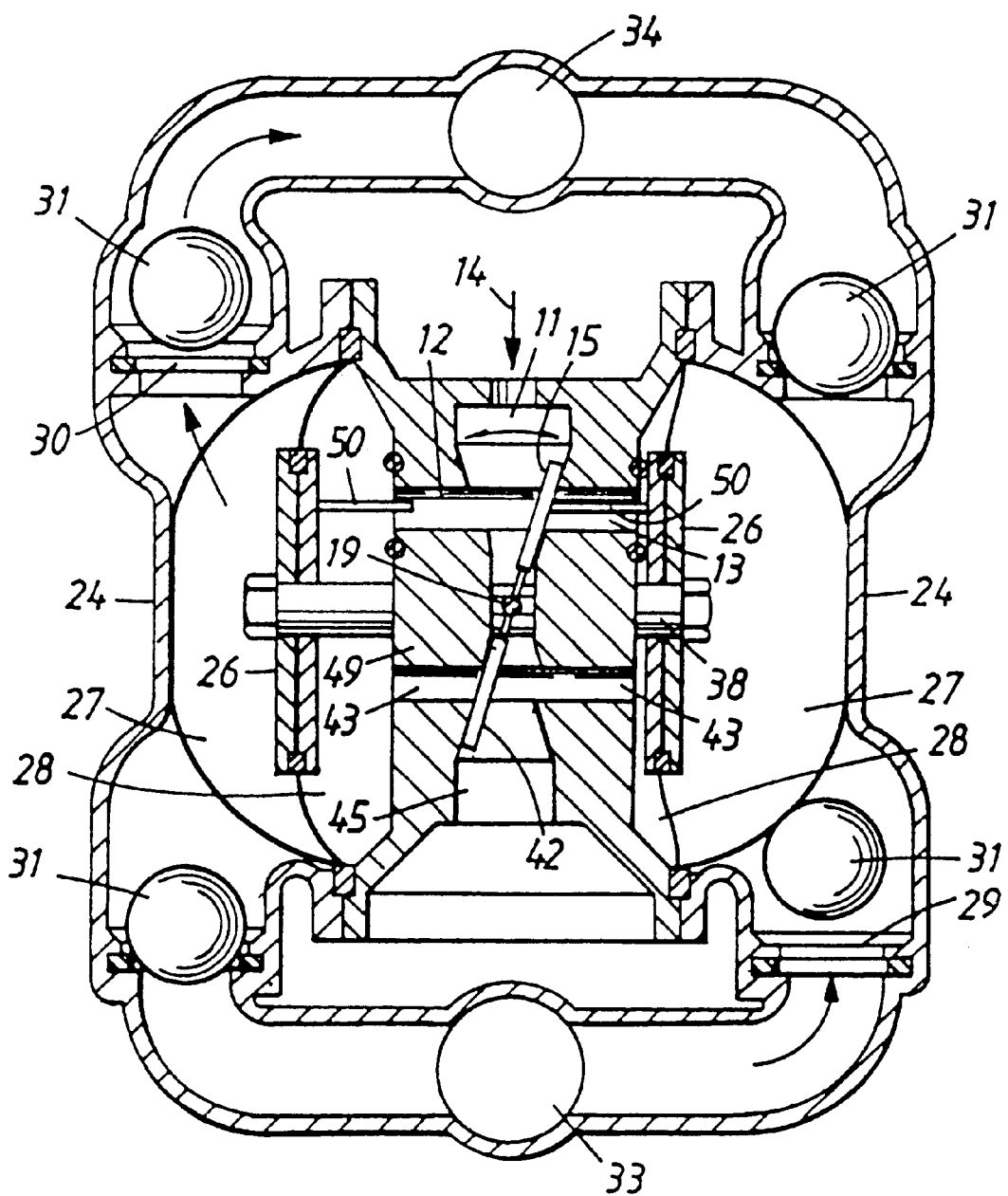
FIG. 3 is a sectional view similar to FIG. 1 which shows a differently designed double-acting pump whose pump housing accommodates an inventive valve arrangement which includes a further modified resetting means.

In the arrangement illustrated in FIG. 3, the double-acting pump is of the kind where the working chambers 27 are located proximal to the end-walls 24 of the pump housing and where the flow of medium through said chambers is controlled by ball valves 31. The operating chambers 23 are thus located close to one another on opposite sides of a central pump-housing part 49 which includes a valve arrangement of the construction shown in FIG. 2. Resetting of the valve element 15, and therewith also of the valve element 42, however, is initiated mechanically. The mutually facing sides of the central parts 36 of the partition walls 26 are provided to this end with pins 50 which extend axially into a respective outlet port 12, 13. The length of the pins is adapted so that when the partition walls 26 occupy their inner positions, the pins 50 will press the valve element 15 slightly away from the position in which one of the mutually opposite surfaces 16 of said valve element closes an outlet port, either port 12 or port 13, so as to thereafter reset the valve element 15 under the influence of the fluid flow through the valve arrangement, and therewith close the other outlet port.

Figure 4:
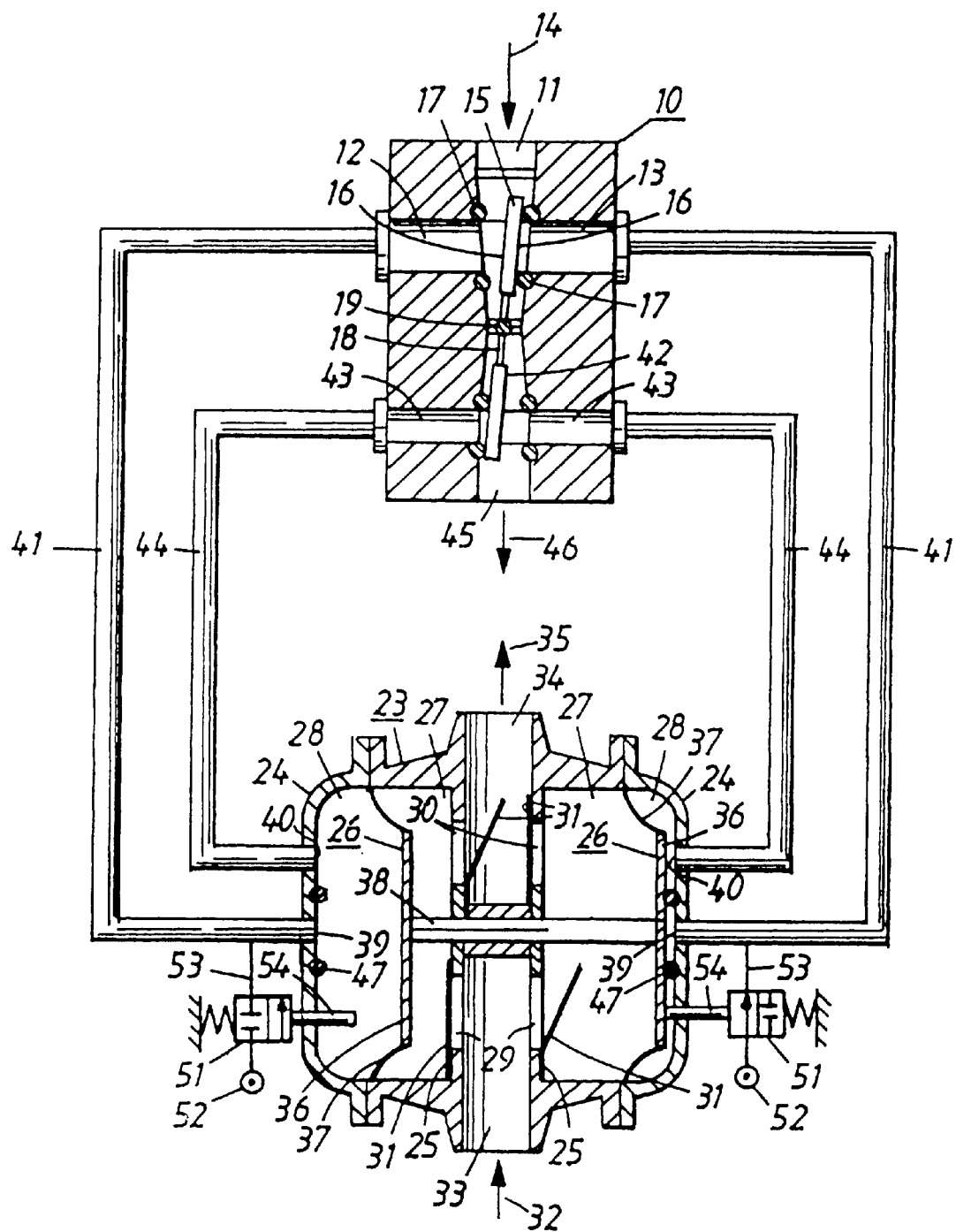
FIG. 4 is a sectional view similar to FIG. 1 and shows yet another modified version of the resetting means.

The arrangement illustrated in FIG. 4 coincides with the arrangement illustrated in FIG. 1 except in the following respects: The bleed passageways 21 of the FIG. 1 arrangement have been replaced in the FIG. 4 arrangement with a balancing valve system that includes two valves 51. The valves 51 are connected to a pressurized fluid network 52, suitably the same network as that which delivers drive fluid to the inlet port 11. Each of the valves can be connected to a respective drive-fluid conduit 41, and therewith to a respective port 12, 13, via conduits 53. The valves 51 are two-position valves which are spring biased towards a normal mode or state in which the connection between the network 52 and the conduits 53 is broken, but which can be set against the action of said spring force to an active mode or state in which connection between network 52 and conduit 53 is established. To enable resetting or switching of the valves to be achieved, each of the valves includes a respective pin 54. Each of the pins 54 projects into its respective chamber 28 and, as it engages a partition wall 26 approaching its outer end position, switches the valve concerned to its active state. In FIG. 4, the left valve 54 is in its normal state, or rest mode, in which connection between the network 52 and the conduit 53 is broken, whereas the right valve 51has been switched to its active state or mode as a result of the partition wall 36 acting on the pin 54, wherewith the outlet port 13 is connected to the compressed air network 52 via the right valve 51 and the conduits 53 and 41. There is then generated briefly in port 13 an over pressure which causes resetting of the valve element 15, therewith causing the partition walls 26 to move to the left in FIG. 4 and enabling the valve 51 to return to its rest mode.

It will be understood that the invention is not restricted to the aforedescribed and illustrated exemplifying embodiments thereof and that modifications can be made within the scope of the inventive concept as defined in the Claims. For instance, movement of the valve element from one or the other of its closing positions can be initiated electromagnetically and the conduits 53 of the embodiment illustrated in FIG. 4 may open into associated operating chambers 28. Similarly, the pins 54 may be attached to associated partition walls 26 and mounted for axial movement in the nearby pump end-wall, for resetting the valves 51 in the outer end positions of respective partition walls 26. The movement transferring device 38 connected to the partition walls 26 may be sprung in the direction of its longitudinal axis, for instance in the manner shown in WO 96/34201, wherewith the operating chambers 28 may also be placed under pressure simultaneously for short periods of time, so as to avoid pulsations in the pumped working medium. The build-up of pressure in the port 12 or the port 13 may be controlled with the aid of throttle check valves in the conduits 41.

It will be understood that for reasons of clarity, the valve arrangement illustrated in FIGS. 1–4 has been greatly enlarged in relation to the double-acting pump. However, the valve arrangement may be constructed for all manner of gas or liquid flows, i.e. from very small to very large fluid flows, and the term liquid shall be understood to also include fluid/solids dispersions and slurries.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A valve arrangement comprising a valve housing that includes an inlet port and two respective outlet ports for fluid passing through the housing, a valve element which is accommodated in a first valve space in the valve housing and movable between two end positions and which includes two mutually opposite surfaces, each of which is adapted for co-action with said outlet port such as to close said outlet port in a respective one and the other of the two end positions of said valve element, and resetting means for resetting said valve element between said positions, said valve element being mounted on one end of a pivotal arm, said valve element having a valve plate which includes mutually opposite surfaces for alternate co-action with said respective outlet port; and said pivotal arm carrying said valve element and connected mechanically to drive a further valve element accommodated in a separate, second valve space, said further valve element being driven between two positions in which it connects either one or the other of further two fluid inlet ports to a further fluid outlet port which is common to said further two inlet ports.

2. The valve arrangement according to claim 1, wherein said pivotal arm extends into the second valve space and carries the further valve element at a second end located within said second valve space, wherewith said further valve element is a valve plate which includes mutually opposite valve-element surfaces for co-action with a respective associated inlet port.

3. The valve arrangement according to claim 1, wherein said valve arrangement is co-ordinated with a double-acting pump which includes two spaces having valve-controlled respective inlets and outlets for a gaseous drive fluid and a liquid working fluid transported by the pump, wherewith said spaces are divided into an operating chamber and a working chamber by means of a movable partition wall in the form of a diaphragm; in that a device for transferring movement of one partition wall to the other partition wall, and vice versa, extends between said movable partition walls, and in that each of the operating-chamber inlets is coupled to its respective outlet port associated with the first valve space of said valve arrangement, and each operating chamber outlet is connected to its respective fluid inlet port associated with said second valve space.

4. The valve arrangement according to claim 3, wherein said each operating chamber is connected to its respective outlet port of the valve arrangement via a conduit which is adapted to be closed by the associated partition wall immediately prior to the commencement of a working stroke of said partition wall; and in that a fluid bleed opening extends between the outlet ports and the inlet port common to said outlet ports.

5. The valve arrangement according to claim 4, wherein said each of the bleed openings is comprised of a bore or channel that extends through the material of the valve housing or through associated valve element.

6. The valve arrangement according to claim 4, wherein said partition walls include bellow-like structures which are open to said conduits and which function to generate an over pressure in an associated conduit when closing said conduit.

7. The valve arrangement according to claim 3, wherein said operating chambers are located close together on both sides of the valve arrangement, and in that the partition walls are provided with pins which each extend into a respective outlet port and, when the partition walls are in their inner end positions, act on an associated valve-element surface so as to reset the valve element.

8. The valve arrangement according to claim 1, wherein said pivotal arm extends into the second valve space and carries the further valve element at a second end located within said second valve space, wherewith said further valve element is a valve disc which includes mutually opposite valve-element surfaces for co-action with a respective associated inlet port.

9. The valve arrangement according to claim 3, wherein said each operating chamber is connected to its respective outlet port of the valve arrangement via a conduit which is adapted to be closed by the associated partition wall immediately prior to the commencement of a working stroke of said partition wall; and in that a fluid bleed passageway extends between the outlet ports and the inlet port common to said outlet ports.

10. The valve arrangement according to claim 9, wherein said each of the bleed passageways is comprised of a bore or channel that extends through the material of the valve housing or through associated valve element.

11. A valve arrangement comprising a valve housing that includes a first inlet port and two respective first outlet ports for fluid passing through the housing, a first valve element which is accommodated in a first valve space in the valve housing and movable between two end positions and which includes two mutually opposite surfaces, each of which is adapted for co-action with said first outlet port to close said first outlet port in a respective one and the other of the two end positions of said first valve element, and resetting means for resetting said first valve element between said positions, said first valve element being mounted on one end of a pivotal arm, said first valve element having a valve disc which includes mutually opposite surfaces for alternate co-action with said respective outlet port; and said pivotal arm carrying said first valve element and connected mechanically to drive a second valve element accommodated in a separate, second valve space, said second valve element being driven between two positions in which it connects either one or the other of two second fluid inlet ports to a second fluid outlet port which is common to said two second inlet ports.

12. The valve arrangement according to claim 11, wherein said pivotal arm extends into the second valve space and carries the second valve element at a second end located within said second valve space, wherewith said second valve element is a valve disc which includes mutually opposite valve-element surfaces for co-action with a respective associated inlet port.

13. The valve arrangement according to claim 12, wherein said pivotal arm extends into the second valve space and carries the second valve element at a second end located within said second valve space, wherewith said second valve element also is a valve plate which includes mutually opposite valve-element surfaces for co-action with a respective associated inlet port.

14. The valve arrangement according to claim 11, wherein a fluid bleed opening extends between the outlet ports and the inlet port common to said outlet ports.

15. The valve arrangement according to claim 14, wherein said each of the bleed openings is comprised of a bore or channel that extends through the material of the valve housing or through associated valve element.

16. The valve arrangement according to claim 11, wherein a fluid bleed passageway extends between the outlet ports and the inlet port common to said outlet ports.

17. The valve arrangement according to claim 16, wherein said each of the bleed passageways is comprised of a bore or channel that extends through the material of the valve housing or through associated valve element.

* * * * *